(12) United States Patent
Savvopoulos

(10) Patent No.: US 9,245,360 B2
(45) Date of Patent: Jan. 26, 2016

(54) COMPUTING DEVICES AND METHODS FOR DETERMINISTICALLY PLACING GEOMETRIC SHAPES WITHIN GEOGRAPHIC MAPS

(75) Inventor: Christos Savvopoulos, Zurich (CH)

(73) Assignee: GOOGLE INC., Mountain View, CA (US)

( * ) Notice: Subject to any disclaimer, the term of this patent is extended or adjusted under 35 U.S.C. 154(b) by 759 days.

(21) Appl. No.: 13/529,666

(22) Filed: Jun. 21, 2012

(65) Prior Publication Data
US 2015/0187097 A1 Jul. 2, 2015

(51) Int. Cl.
*G06T 11/20* (2006.01)

(52) U.S. Cl.
CPC ...................................... *G06T 11/20* (2013.01)

(58) Field of Classification Search
None
See application file for complete search history.

(56) References Cited

U.S. PATENT DOCUMENTS

| | | | |
|---|---|---|---|
| 5,848,375 A * | 12/1998 | Nunobiki et al. | 701/455 |
| 5,864,632 A | 1/1999 | Ogawa et al. | |
| 6,424,911 B2 * | 7/2002 | Yamashita et al. | 701/410 |
| 2005/0058155 A1 * | 3/2005 | Mikuriya et al. | 370/474 |
| 2007/0076920 A1 * | 4/2007 | Ofek | 382/113 |
| 2013/0169685 A1 * | 7/2013 | Lynch | 345/634 |
| 2013/0328863 A1 * | 12/2013 | Pirwani | 345/419 |
| 2013/0328941 A1 * | 12/2013 | Carbonneau et al. | 345/667 |

* cited by examiner

*Primary Examiner* — Tize Ma
*Assistant Examiner* — Yu Chen
(74) *Attorney, Agent, or Firm* — Marshall, Gerstein & Borun LLP

(57) ABSTRACT

The present disclosure is related to geographic maps including a plurality of map tiles having various geometric shapes. A determination is made for each map tile as to whether road segment geometry for a road corresponding to the geometric shape is available. The geometric shape is positioned using an actual road width when it is determined that the road segment geometry is available. The geometric shape is positioned using a default road width when it is determined that the road segment geometry is unavailable.

15 Claims, 10 Drawing Sheets

COMPUTING DEVICES AND METHODS FOR DETERMINISTICALLY PLACING GEOMETRIC SHAPES WITHIN GEOGRAPHIC MAPS

FIELD OF THE INVENTION

The present disclosure relates to geographic maps that include geometric shapes, such as buildings, properties and landmarks. More specifically, the present disclosure relates to deterministically placing geometric shapes within geographic maps utilizing a corresponding road as a reference point.

BACKGROUND

Geographic mapping applications represent some of the most frequently used computer based applications. The underlying geographic maps often include various features, such as buildings, properties and landmarks in addition to roadways. The buildings, properties, landmarks and other features are represented within the geographic maps using geometric shapes.

Geometric shapes are placed within a corresponding geographic map proximate a corresponding road or roads. It is desirable to consistently position geometric shapes relative to a specific (x, y) coordinate location within a geographic map irrespective of whether the corresponding road segment geometry is available.

SUMMARY

A method of rendering geometric shapes adjacent to corresponding roads within a geographic map includes determining one or more map tiles on which a geometric shape will be rendered. The geometric shape is associated with a road having a corresponding road segment geometry. Each map tile includes graphical data of a corresponding geographical region at a specific zoom level. The method further includes determining, for each map tile on which the geometric shape will be rendered, whether the corresponding road segment geometry is available in the map tile and rendering each of the one or more map tiles with the geometric shape according to the determination of whether the corresponding road segment geometry is available. For each map tile for which the corresponding road segment geometry is available, rendering the map tile with the geometric shape includes using (1) a first vector that is inside of a polyline of the road segment geometry, (2) a second vector, perpendicular to the first vector, that indicates the side of the road on which the geometric shape will be rendered, and (3) a value corresponding to the actual width of the road segment geometry. For each map tile for which the corresponding road segment geometry is not available, rendering the map tile with the geometric shape includes using (1) a first vector that is inside of a polyline of the road segment geometry, (2) a second vector, perpendicular to the first vector, that indicates the side of the road on which the geometric shape will be rendered, and (3) a value corresponding to a default width of the road segment geometry.

In another embodiment, a computer-readable storage medium having stored thereon instructions executable by a processor to cause the processor to perform a method of deterministically positioning geometric shapes at predetermined locations within a geographic map includes determining one or more map tiles on which at least a portion of a geometric shape will be positioned. The geometric shape is associated with a road having a corresponding road segment geometry. Each map tile includes graphical data of a corresponding geographical region at a specific zoom level. The instructions further include determining, for each map tile on which at least a portion of the geometric shape will be positioned, whether the corresponding road segment geometry is available in the map tile and positioning the geometric shape according to the determination of whether the corresponding road segment geometry is available. For each map tile for which the corresponding road segment geometry is available, positioning the geometric shape includes using a value corresponding to the actual width of the road segment geometry. For each map tile for which the corresponding road segment geometry is not available, positioning the geometric shape includes using a value corresponding to a default width of the road segment geometry.

In a further embodiment, a method of deterministically positioning geometric shapes in predetermined locations within a geographic map includes determining one or more map tiles on which at least a portion of a geometric shape will be positioned. The geometric shape is associated with a road having a corresponding road segment geometry. Each map tile comprising graphical data of a corresponding geographical region at a specific zoom level. The method further includes determining, for each map tile on which at least a portion of the geometric shape will be positioned, whether the corresponding road segment geometry is available in the map tile and processing each of the one or more map tiles with at least a portion of the geometric shape according to the determination of whether the corresponding road segment geometry is available. For each map tile for which the corresponding road segment geometry is available, positioning the geometric shape includes using a value corresponding to the actual width of the road segment geometry. For each map tile for which the corresponding road segment geometry is not available, positioning the geometric shape includes using a value corresponding to a default width of the road segment geometry.

In yet a further embodiment, a computing device for rendering geometric shapes adjacent to corresponding roads in a mapping interface includes a memory, a processor and a map tile determination module stored on the memory that, when executed on the processor, determines one or more map tiles on which a geometric shape will be rendered, the geometric shape associated with a road having a corresponding road segment geometry, each map tile comprising graphical data of a corresponding geographical region at a specific zoom level. The computing device further includes a road segment geometry availability determination module stored on the memory that, when executed on the processor, determines, for each map tile on which the geometric shape will be rendered, whether the corresponding road segment geometry is available in the map tile and a map tile rendering module stored on the memory that, when executed on the processor, renders each of the one or more map tiles with the geometric shape according to the determination of whether the corresponding road segment geometry is available. For each map tile for which the corresponding road segment geometry is available, rendering the map tile with the geometric shape includes using (1) a first vector that is inside of a polyline of the road segment geometry, (2) a second vector, perpendicular to the first vector, that indicates the side of the road on which the geometric shape will be rendered, and (3) a value corresponding to the actual width of the road segment geometry. For each map tile for which the corresponding road segment geometry is not available, rendering the map tile with the geometric shape includes using (1) a first vector that is inside of a polyline of the road segment geometry, (2) a second vector, perpendicular to the first vector, that indicates the side of the road on which the geometric shape will be rendered, and (3) a value corresponding to a default width of the road segment geometry.

In even a further embodiment, a computer-readable storage medium having stored thereon instructions executable by a processor to cause the processor to perform a method of rendering geometric shapes adjacent to corresponding roads in a mapping interface includes determining one or more map tiles on which a geometric shape will be rendered. The geometric shape is associated with a road having a corresponding road segment geometry. Each map tile includes graphical data of a corresponding geographical region at a specific zoom level. The instructions further include determining, for each map tile on which the geometric shape will be rendered, whether the corresponding road segment geometry is available in the map tile and rendering each of the one or more map tiles with the geometric shape according to the determination of whether the corresponding road segment geometry is available. For each map tile for which the corresponding road segment geometry is available, rendering the map tile with the geometric shape includes using a value corresponding to the actual width of the road segment geometry. For each map tile for which the corresponding road segment geometry is not available, rendering the map tile with the geometric shape includes using a value corresponding to a default width of the road segment geometry.

The features and advantages described in this summary and the following detailed description are not all-inclusive. Many additional features and advantages will be apparent to one of ordinary skill in the art in view of the drawings, specification, and claims hereof.

DETAILED DESCRIPTION

Geographic mapping applications include a geographic map, or a portion of a geographic map displayed on a display device within a map viewport having various geometric shapes deterministically placed in relation to corresponding roadways. The geometric shapes represent features, such as buildings, landmarks, properties, etc. The geometric shapes are positioned within a given geographic map based on (x, y) coordinates that are referenced to road segment geometry associated with a corresponding road segment. Often, display of a geographic map, or a portion of a geographic map within a map viewport includes displaying an array of map tiles, with each map tile corresponding to and depicting a given geographic area.

Figure 1:
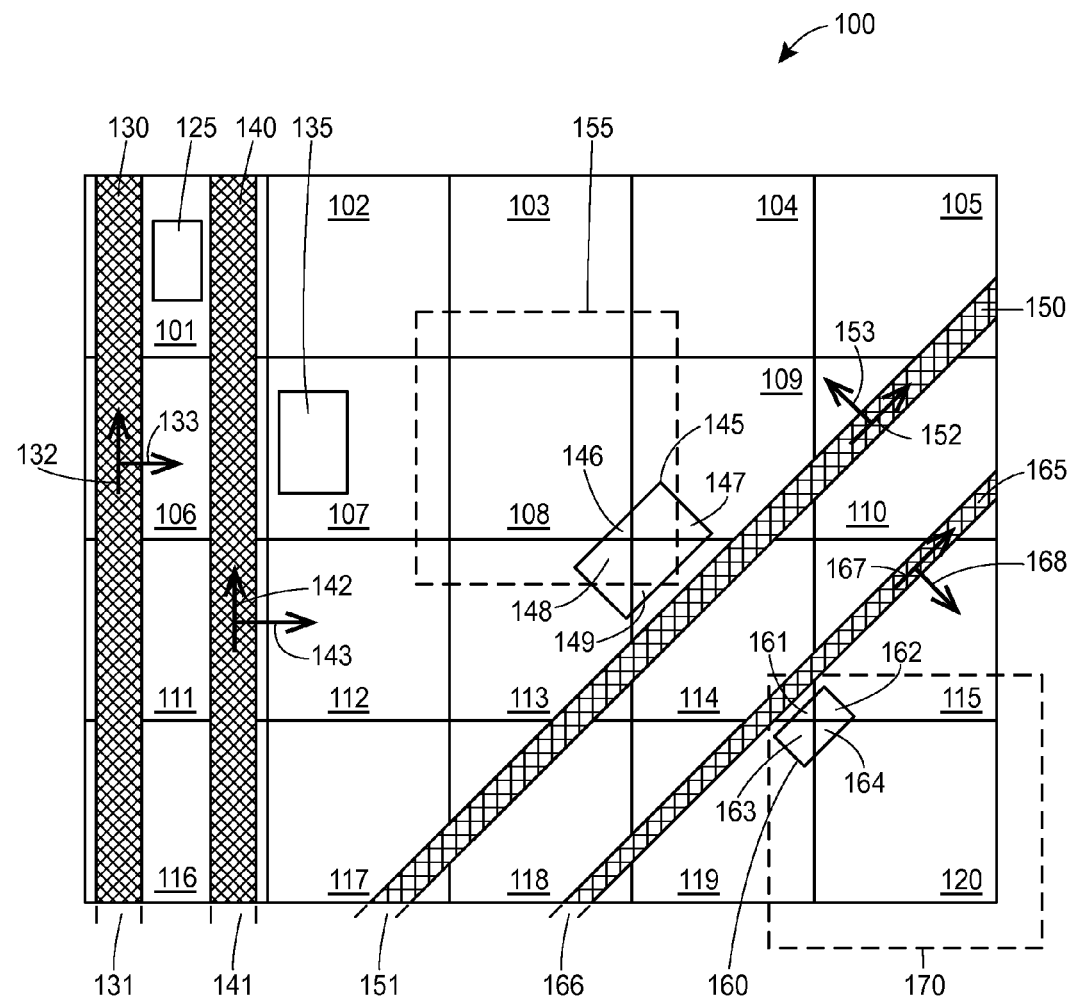
FIG. 1 depicts a map viewport including a plurality of map tiles having geometric shapes with corresponding road segments dispersed among the map tiles.

FIG. 1 depicts a map viewport 100 having an array of map tiles 101-120 arranged in four rows and five columns. While, for purposes of simplification and ease of illustration, the map viewport 100 is depicted to include only twenty map tiles, it should be understood that a given map viewport may include any number of map tiles depending on a specified zoom level at which the given geographic map is being viewed. As depicted in FIG. 1, the map viewport 100 includes geometric shapes 125, 135, 145, 160 with corresponding road segments 130, 140, 150, 165, respectively. Each geometric shape 145, 160 is depicted to include four individual portions 146, 147, 148, 149 and 161, 162, 163, 164, respectively. Each portion of the given geometric shape 145, 160 is located within a different map tile. Each road segment 130, 140, 150, 165 includes corresponding road segment geometry. The respective road segment geometry includes an actual road segment width 131, 141, 151, 166, an "on_road" vector 132, 142, 152, 167 and an "off_road" vector 133, 143, 153, 168. Each on_road vector is located within the associated polyline for the given road segment and is used as a reference point for placement of the corresponding geometric shape. Each off_road vector is perpendicular to the associated polyline for the given road segment and is used to determine on which side of the road segment to place the corresponding geometric shape. Each of the map tiles 108, 120 includes an enlarged bounding box 155, 170, respectively. As described in detail herein, the enlarged bounding boxes 155, 170 are used to determine when a given road segment is determined to be within any given map tile for the purpose of determining whether road segment geometry is available for placement of a given geometric shape.

At times, a given geometric shape may be near an edge of a given map tile (or at an edge of a given map viewport) and the corresponding road will not be within the given map tile (or within the given map viewport). Therefore, the road segment geometry corresponding to the given road and associated with the geometric shape will be unavailable. In prior art systems, geometric shape placement may be inconsistent when the corresponding road segment geometry is unavailable within a given map viewport or map tile. The present apparatuses and methods provide consistent placement of geometric shapes even when road segment geometry is not available within a given map tile or map viewport.

Deterministically placing geometric shapes is particularly beneficial when a first portion of a geometric shape is located within a first map tile and a second portion of the geometric shape is located within a second map tile. When the individual portions of the geometric shape are not consistently placed within each map tile, the individual portions will not align at the boundary between the corresponding map tiles when the two, or more, map tiles are included within a given map viewport.

As a user of a geographic mapping application zooms, pans or otherwise navigates to different map viewports associated with the overall geographic map, the position of associated geometric shapes within the map viewport is automatically revised relative to corresponding road segment geometry.

Figure 2:
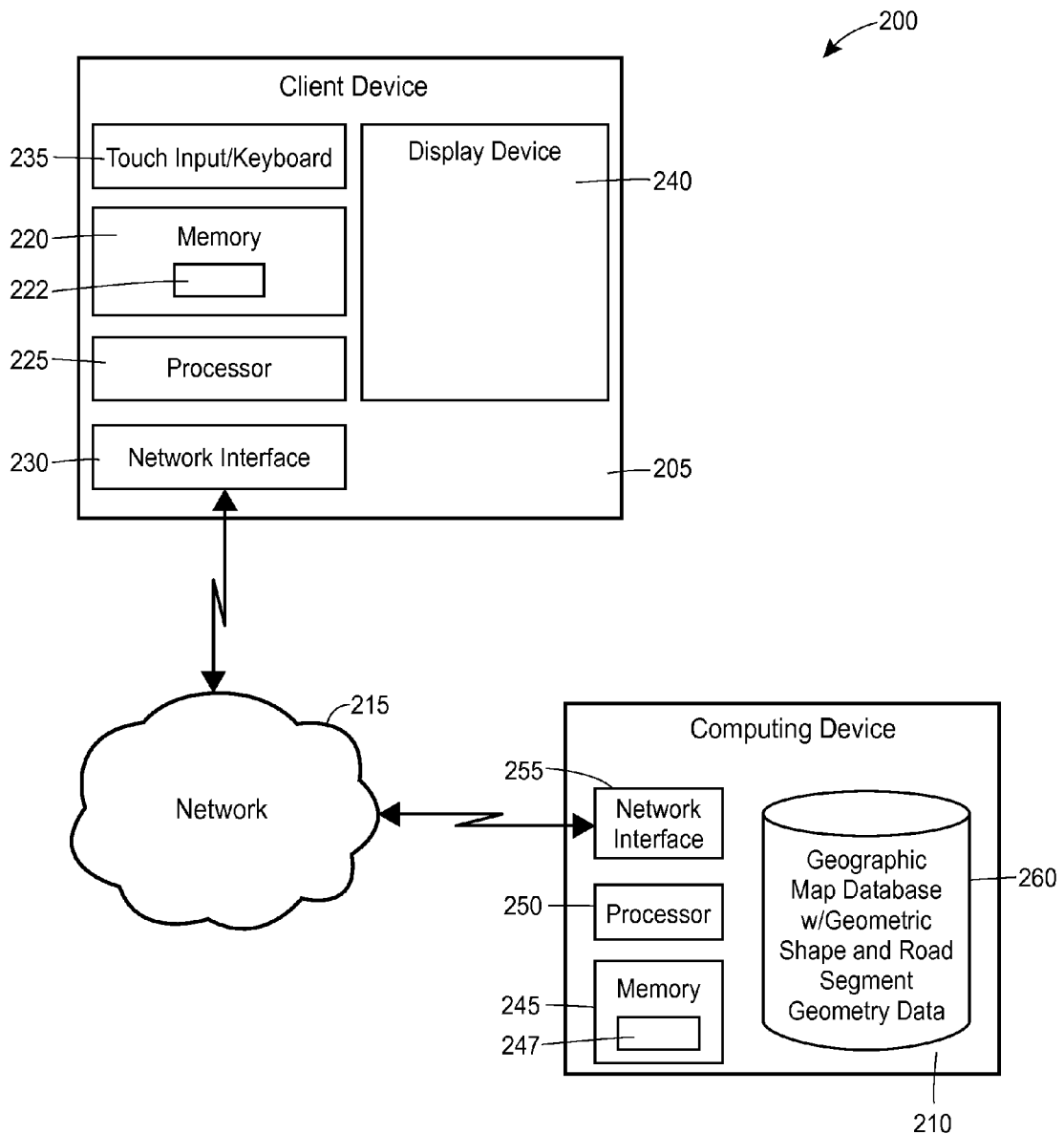
FIG. 2 depicts a high-level block diagram of a geographic mapping system that implements communications between client devices and remote computing device databases to provide information to a user.

The details associated with deterministically placing geometric shapes within a geographic map are now described beginning with reference to FIG. 2. FIG. 2 depicts a high-level block diagram of a geographic mapping system 200 that implements communications between client devices 205 and a database 260 associated with a remote computing device 210 provide information to a user of the client device 205. A client device 205 is communicatively coupled to the computing device 210 via a network 215.

The computing device 210 may include a memory 245 and a processor 250 for storing and executing, respectively, a module 247. The module 247, stored in the memory 245 as a set of computer-readable instructions, facilitates applications related to providing geographic mapping functionality incorporating geometric shapes within corresponding geographic maps. The module 247 may also facilitate communications between the computing device 210 and the client device 205 via a network interface 255 and the network 215. The computing device 210 may also include a geographic map database 260 with geometric shape and road segment geometry data. While the geographic map database 260 is shown in FIG. 2 as contained within the computing device 210, it should be understood that the geographic map database 260 may be located within a separate remote server (or any other suitable computing device) communicatively coupled to the network 215. Optionally, portions of the geographic map database 260 may be stored in memories separate from one another. In any event, the geographic map database 260 includes geometric shape data such as (x, y) coordinates for a set of vertices of polylines or a polygons that define the geometric shapes. The geographic map database 260 also includes the (x, y) coordinates for the road segment geometry including on_vector, off_vector, actual road width, default road width and maximum road width. The first vector, on_road is within a polyline used to represent the road segment and is used as an (x, y) coordinate reference for the corresponding geometric shape. The second vector, off_road is perpendicular to the road segment and is used to determine on which side of the road segment to place the corresponding geometric shape. The actual road width may be the width of a given road segment (or portion of the given road segment) located within a given map tile and corresponding to a given zoom level. The default road width may be a road width of a given road segment corresponding to a given zoom level. The maximum road width may be a maximum width of a given road segment located anywhere within a geographic map corresponding to a given zoom level.

For clarity, only one client device 205 is depicted in FIG. 2. While FIG. 2 depicts only one client device 205, it should be understood that any number of client devices 205 may be supported and that each client device 205 may be any appropriate computing device, such as a desk-top computer, a mobile telephone, a personal data assistant, a lap-top computer, a vehicle-based computer system, etc. The client device 205 may include a memory 220 and a processor 225 for storing and executing, respectively, a module 222 that facilitates applications related to providing geographic mapping functionality incorporating geometric shapes within corresponding geographic maps. The module 222 may also facilitate communications between the computing device 210 and the client device 205 via a network interface 230 and the network 215. The client device 205 may include a geolocation device (not shown), such as a global positioning system receiver or a WiFi positioning device for determining a geographic location of the client device 205. The client device 205 may include a display device 240 which may be any type of electronic display device such as a liquid crystal display (LCD), a light emitting diode (LED) display, a plasma display, a cathode ray tube (CRT) display, or any other type of known or suitable electronic display. The display device 240 may display a map viewport (e.g., the map viewport 100 of FIG. 1, for example) displaying a given geographic area of an overall geographic map at a particular zoom level as specified by a user of the client device 205. The client device 205 may include user input device 235, such as a touch input/keyboard that provides a mechanism for a user of the client device 205 to enter various information. The user input device 235 may be configured as an integral part of a display device 240, such as a touch screen display device. The network interface 230 may be configured to facilitate communications between the client device 205 and the computing device 210 via any hardwired or wireless communication network (e.g., the network 215), including for example a hardwired Ethernet connection or a wireless LAN, MAN or WAN, WiFi, the Internet, or any combination thereof. Moreover, the client device 205 may be communicatively connected to the computing device 210 via any suitable communication system, such as via any publicly available or privately owned communication network, including those that use wireless communication structures, such as wireless communication networks, including for example, wireless LANs and WANs, satellite and cellular phone communication systems, etc.

Figure 3:
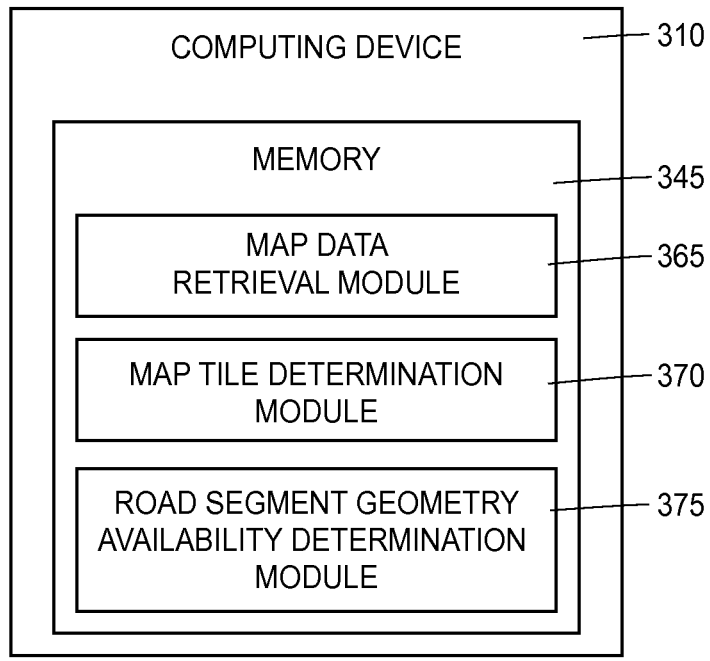
FIG. 3 depicts a block diagram of a computing device including various modules for implementing deterministic placement of geometric shapes within geographic maps.

Turning now to FIG. 3, a block diagram of a computing device 310 is depicted. As described in detail below, the computing device 310 may be suitable for use as either a client device 205 or as the computing device 210 of FIG. 2. In either event, the computing device 310 includes various modules 365, 370, 375 stored on a memory 345. A processor, similar to the processors 225, 250, may execute the modules 365, 370, 375 to deterministically place geometric shapes within associated geographic maps. While the modules 365, 370, 375 may be stored on the memory 245 and implemented as a portion of the module 247, it should be understood that the modules 365, 370, 375, or a portion thereof, may be stored on the memory 220 and implemented as at least a portion of the module 222. While modules 365, 370, 375 may be executed by either processor 225, 250, the modules 365, 370, 375 will be described herein as being executed by processor 250.

In any event, the processor 250 may execute a map data retrieval module 365 that accesses a geographic map database (e.g., the database 260) storing geometric shape and road segment geometry data. The geographic map database 260 may be arranged with associated data partitioned within a plurality of map data tiles. Each map data tile may be associated with a given geographic area and a particular zoom level. A series of map tiles, generated using the map data tiles, may be displayed proximate one another on a client device display (e.g., the display device 240) within a map viewport to depict a user specified geographic map having an associated zoom level. While the map data may be arranged within a plurality of map data tiles, it should be understood that the map data may be stored within a corresponding database in any format and transmitted between a database and a client device in the respective format. The processor 250 may execute a map tile determination module 370 that determines which map data tile(s), within a set of map data associated with a given geographic map viewport, includes a geometric shape or a portion of a geometric shape. The processor 250 may execute a road segment geometry availability determination module 375 that determines whether road segment geometry data is available within each map data tile which includes at least a portion of an associated geometric shape. When road segment geometry is determined to be available within a given map data tile, a corresponding geometric shape (or portion of a geometric shape) is positioned within the associated geographic map using an actual road width so long as no other map tile that includes a portion of the geometric shape and that does not have the road segment geometry available is included within the given map viewport. When road segment geometry is determined to not be available within a given map data tile included with a given map viewport, a corresponding geometric shape (or portion of a geometric shape) is positioned within the associated geographic map using a default road width.

Figure 4:
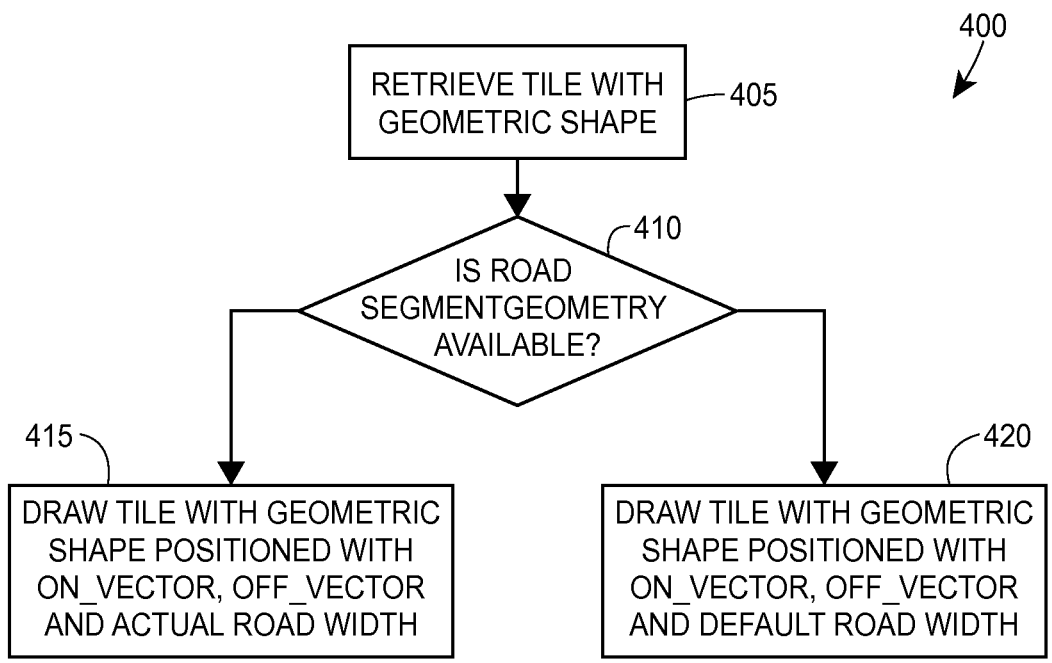
FIG. 4 depicts a flow diagram for a method of placing geometric shapes within geographic maps.

With reference now to FIG. 4, a flow diagram depicts a method 400 of placing (or drawing) geometric shapes within geographic map displays. The method 400 may be implemented within any suitable computing device, such as the client device 205 of FIG. 2 or either of the computing devices 210, 310 of FIGS. 2 and 3, respectively. It should be understood that the modules 222, 247 of FIG. 2 or the modules 365, 370, 375 of FIG. 3 may be executed by a processor, similar to processor 225, 250, to implement the method 400. While the modules 365, 370, 375 may be executed by either processor 225, 250 to implement the method 400, execution by the processor 250 will be described herein. The processor 250, implementing the method 400, retrieves map data having geometric shape data and road segment geometry data from the database 260 (block 405). As described above, the map data may be arranged in map data tiles or may be arranged in any suitable format. The processor 250 may make a determination for each map tile that includes at least a portion of a geometric shape as to whether corresponding road segment geometry data is available within the given map data tile (block 410). If the processor 250 determines that the road segment geometry is available within a given map data tile (block 410), a corresponding geometric shape (or portion of a geometric shape) may be drawn within an associated geographic map display using an actual road width (block 415). If, on the other hand, the processor 250 determines that the road segment geometry is not available within a given map tile (block 410), a corresponding geometric shape (or portion of a geometric shape) may be drawn within the associated geographic map display using a default road width (block 420).

Figure 5:
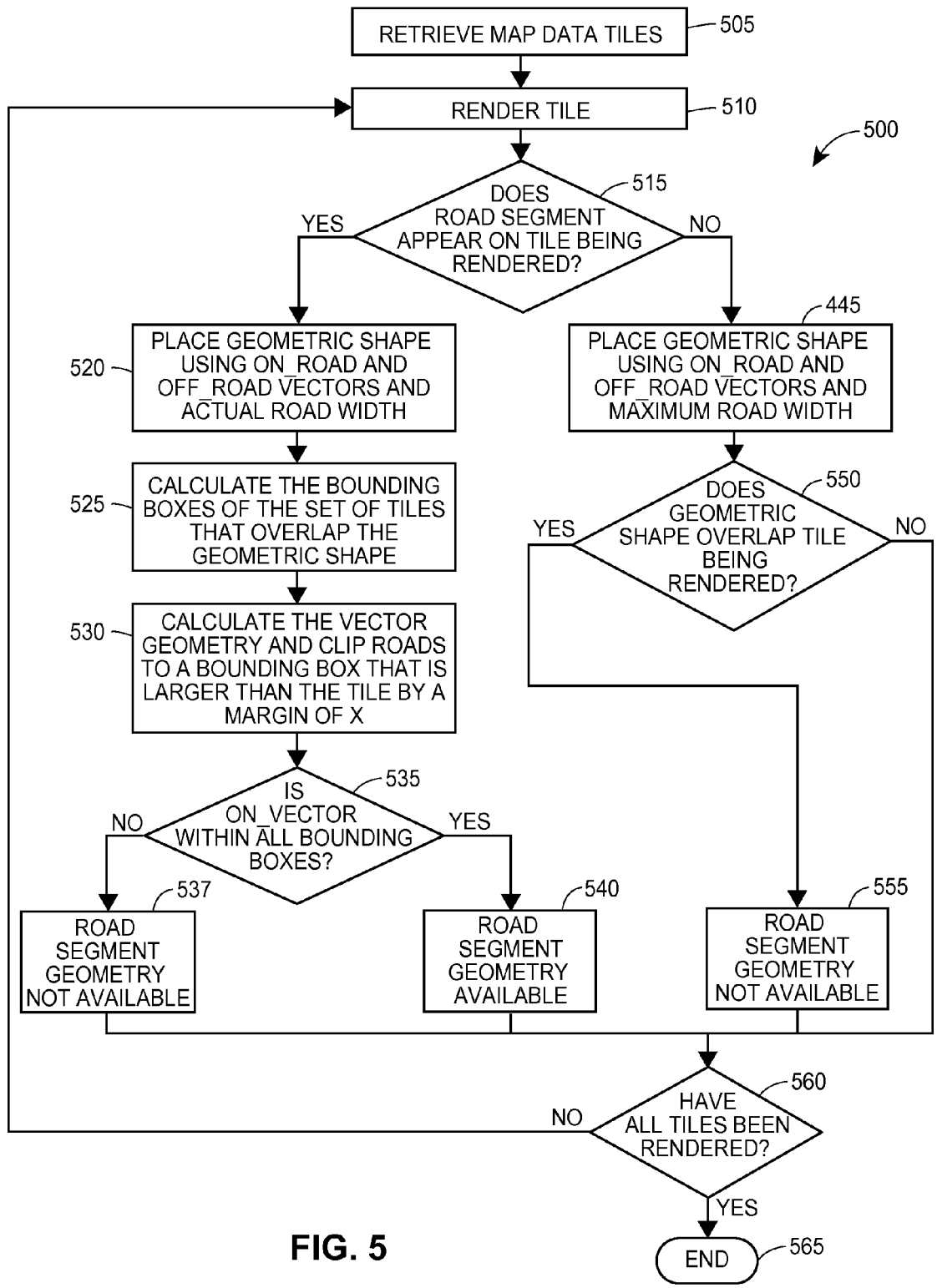
FIG. 5 depicts a flow diagram for a method of determining if road segment geometry is available within a map tile that includes a geometric shape.

Turning now to FIG. 5, a flow diagram depicts a method 500 of determining if road segment geometry is available within a map tile having a corresponding geometric shape. The method 500 of determining if road segment geometry is available within a map tile having a corresponding geometric shape may be implemented within any suitable computing device, such as the client device 205 of FIG. 2 or either of the computing devices 210, 310 of FIGS. 2 and 3, respectively. It should be understood that the modules 222, 247 of FIG. 2 or the modules 365, 370, 375 of FIG. 3 may be executed by a processor, similar to the processors 225, 250 of FIG. 2, to perform the method 500. While the modules 365, 370, 375 may be executed by either processor 225, 250 to implement the method 500, execution by the processor 250 will be described herein.

The processor 250 may retrieve, from the map database 260 of FIG. 2, map data having geometric shape data and road segment geometry data (block 505). As described above, the map data may be arranged in map data tiles or may be arranged in any suitable format. The processor 250 may render map data tiles including at least a portion of at least one geometric shape (block 510). The processor 250 may make a determination, for each map data tile that is being rendered, as to whether a corresponding road segment appears within the given map tile (block 515). When the road segment is determined to appear within a given map tile (block 515), a corresponding geometric shape (or portion of a geometric shape) may be placed using the corresponding on_road vector, off_road vector and actual road width (block 520). The processor 250 may calculate bounding boxes of a set of map tiles that overlap at least a portion of a given geometric shape (block 525). Each bounding box encompasses a corresponding map tile and a surrounding perimeter of the given map tile. The processor 250 may calculate vector geometry for a road segment corresponding to a geometric shape and clip the road segment at an edge of the bounding box (block 530). The processor 250 determines if the road segment geometry is within the bounding box (block 530). The road segment geometry is determined to be available within the corresponding map tile even though the road segment may not be within the confines of the map tile itself if the road segment is within the enlarged bounding box of the map tile (block 530). The processor 250 may make a determination as to whether the corresponding on_vector is within all the bounding boxes of all the map tiles that overlap the geometric shape or a portion of a given geometric shape (block 535). When the on_vector is not within the bounding boxes of all of the set of tiles that overlap the geometric shape, the processor 250 may make a determination that the road segment geometry is not available (block 537). When the on_vector is within the bounding boxes of all of the set of tiles that overlap the geometric shape, the processor 250 may make a determination that the road segment geometry is available to the given map data tile being rendered (block 540).

When the road segment is determined by the processor 250 to not appear within a given map tile that is being rendered (block 515), the processor may place a corresponding geometric shape using the on_road vector, the off_road vector and a maximum road width (block 545). The processor 250 may make a determination as to whether at least a portion of the geometric shape overlaps the tile being rendered (block 550). If a determination is made that at least a portion of the geometric shape overlaps the tile being rendered (block 550), then the processor 250 may determine that the road segment geometry is not available (block 555).

The processor 250 may make a determination as to whether all the map data tiles have been rendered (block 560). If all the map data tiles have not been rendered, the method returns to block 510 and another map data tile is rendered. If all the map data tiles have been rendered, the method ends (block 565).

Figure 6:
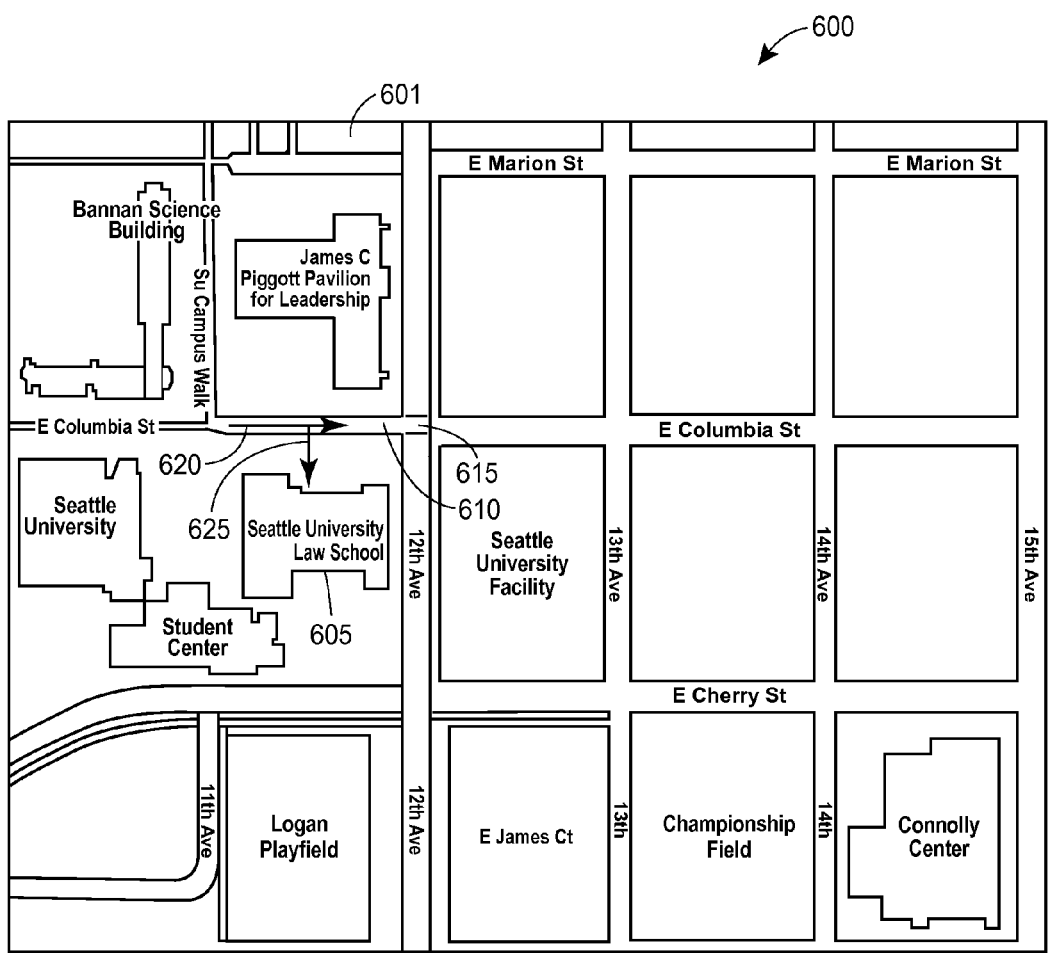
FIG. 6 depicts a map viewport including a geographic map having geometric shapes proximate corresponding roads.

With reference now to FIG. 6, a map viewport 600 is depicted including a geographic map 601 having a geometric shape 605 proximate a corresponding road 610. The road 610 includes road segment geometry having an on_vector 620, an off_vector 625 and an actual road width 615. When the road segment geometry is available within all map tiles that include at least a portion of the geometric shape 605 and that are included with the map viewport 600, the geometric shape 605 is positioned within the geographic map 601 using the on_vector 620, the off_vector 625 and the actual road width 615. When the road segment geometry is not available within a map tile that includes at least a portion of the geometric shape 605 and that map tile is included within the map viewport 600, the geometric shape 605 is positioned within the geographic map 601 using the on_vector 620, the off_vector 625 and a default road width. The default road width may be, for example, a maximum road width associated with any road within the overall geographic map at the given zoom level.

Turning now to FIGS. 7-11, a series of examples are presented that employ the devices of FIGS. 2 and 3 to implement the methods of FIGS. 4 and 5 to determine whether any given map tile that includes a geometric shape (or portion of a geometric shape) also has road segment geometry available and to correspondingly place a given geometric shape within a geographic map. For the purposes of illustration, the block numbers associated with FIGS. 4 and 5 have been included within the descriptions of FIGS. 7-11 to indicate corresponding portions of the methods 400, 500 that are implemented.

Figure 7:
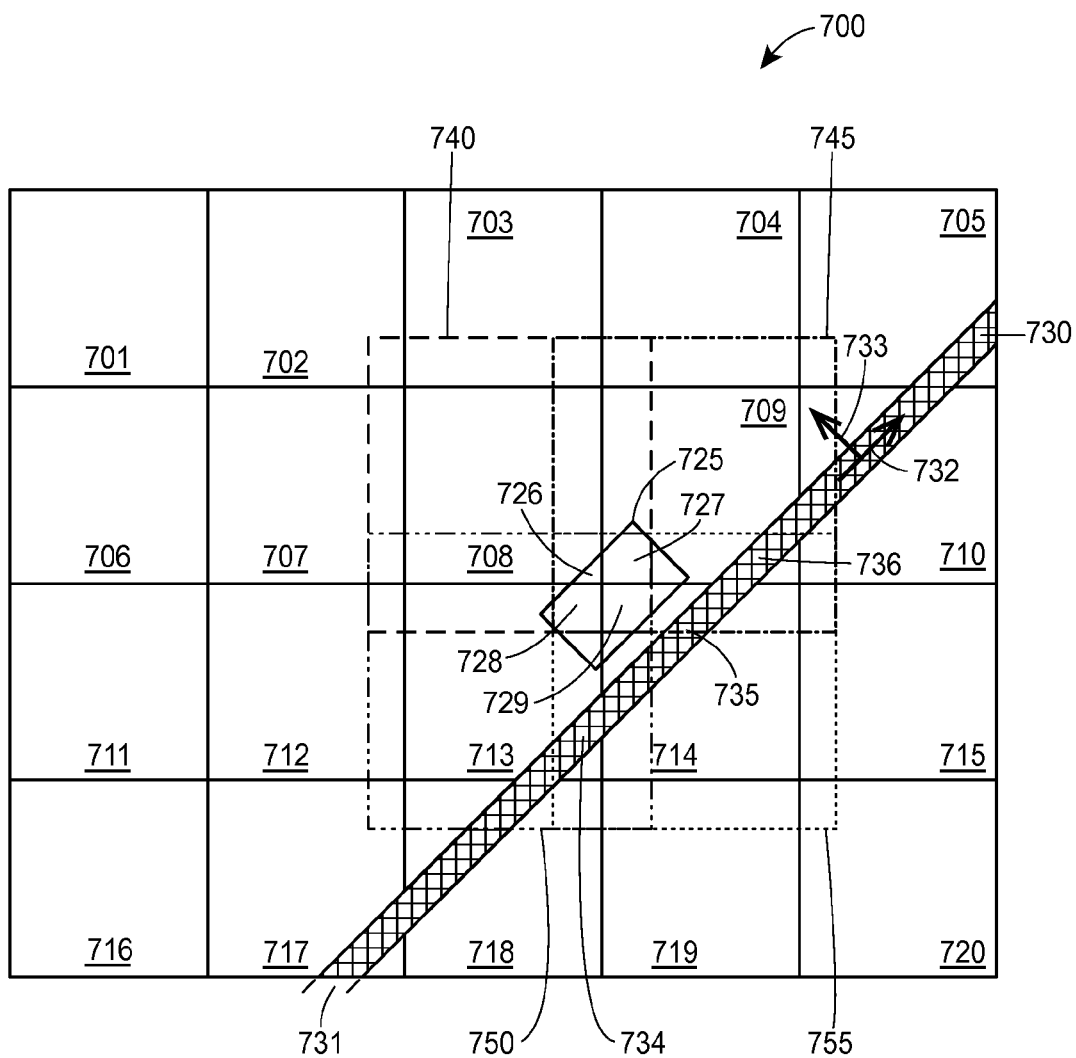
FIG. 7 depicts a first example of a map viewport including a geometric shape that has portions located within four different map tiles of a geographic map proximate a corresponding road.

FIG. 7 depicts a first example of a geographic map within a map viewport 700 including a plurality of map tiles 701-720. The geographic map includes a geometric shape 725 having portions 726, 727, 728, 729. Each portion 726, 727, 728, 729 of the geometric shape 725 overlaps a portion of a respective map tile 708, 709, 713, 714. The geometric shape 725 is located proximate a corresponding road segment 730 having road segment portions 734, 735, 736. The road segment 730 has associated road segment geometry including an actual road segment width 731, an on_vector 732 and an off_vector 733. Each road segment portion 734, 735, 736 is within a portion of a respective map tile 713, 714, 709. Each map tile 708, 709, 713, 714 is surrounded by a respective enlarged bounding box 740, 745, 750, 755.

For the purposes of determining whether the road segment geometry is available in map tile 708, the road segment 730 does not appear in the map tile 708 (block 515), therefore the geometric shape 725 is placed using on_vector 732, off_vector 733 and a maximum road width (block 545). Because the geometric shape portion 726 overlaps a portion of the map tile 708 (block 550), the road segment geometry is determined to not be available in map tile 708 (block 555).

For the purposes of determining whether the road segment geometry is available in map tile 709, the road segment portion 736 appears in map tile 709 (block 515), therefore the geometric shape 725 is placed using on_vector 732, off_vector 733 and the actual road segment width 731 (block 520). The enlarged bounding boxes 740, 745, 750, 755 are calculated because a portion 726, 727, 728, 729 of the geometric shape 725 overlaps a respective portion of a respective map tile 708, 709, 713, 714 (block 525). Because the road segment 730 is not within the map tile 708 or the enlarged bounding box 740 (block 535), the road segment geometry is determined to not be available in map tile 709 (block 537).

For the purposes of determining whether the road segment geometry is available within map tile 713, the road segment portion 734 appears in map tile 713 (block 515), therefore the geometric shape 725 is placed using on_vector 732, off_vector 733 and the actual road segment width 731 (block 520). The enlarged bounding boxes 740, 745, 750, 755 are calculated because a portion 726, 727, 728, 729 of the geometric shape 725 overlaps a respective portion of a respective map tile 708, 709, 713, 714 (block 525). Because the road segment 730 is not within the map tile 708 or the enlarged bounding box 740 (block 535), the road segment geometry is determined to not be available in map tile 713 (block 537).

For the purposes of determining whether the road segment geometry is available within map tile 714, the road segment portion 735 appears in map tile 714 (block 515), therefore the geometric shape 725 is placed using on_vector 732, off_vector 733 and the actual road segment width 731 (block 520). The enlarged bounding boxes 740, 745, 750, 755 are calculated because a portion 726, 727, 728, 729 of the geometric shape 725 overlaps a respective portion of a respective map tile 708, 709, 713, 714 (block 525). Because the road segment 730 is not within the map tile 708 or the enlarged bounding box 740, the road segment geometry is determined to not be available in map tile 714 (block 537).

Figure 8:
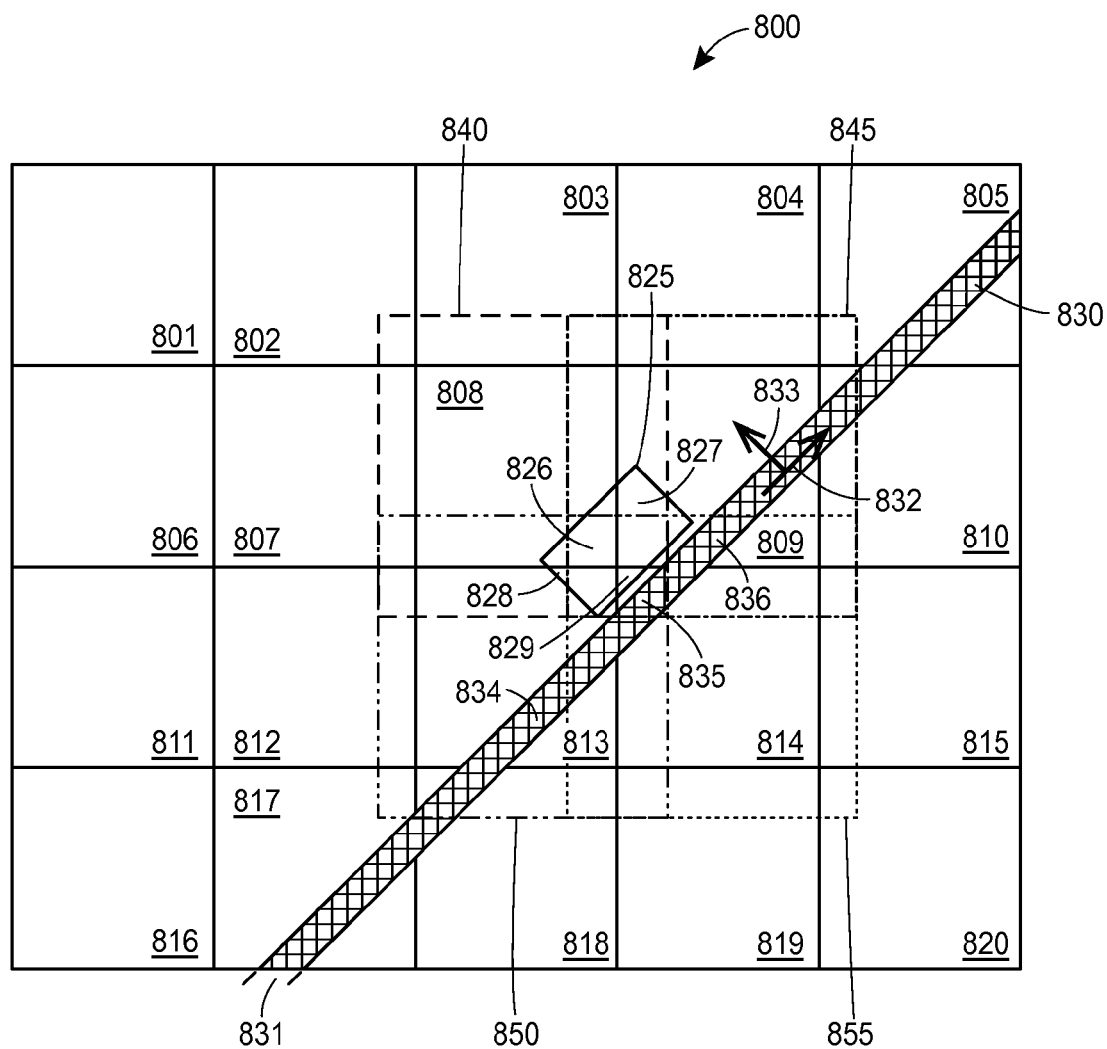
FIG. 8 depicts a second example of a map viewport including a geometric shape that has portions located within four different map tiles of a geographic map proximate a corresponding road.

FIG. 8 depicts a second example of a geographic map within a map viewport 800 including a plurality of map tiles 801-820. The geographic map includes a geometric shape 825 having portions 826, 827, 828, 829. Each geometric shape portion 826, 827, 828, 829 overlaps a portion of a respective map tile 808, 809, 813, 814. The geometric shape 825 is located proximate a corresponding road segment 830 having portions 834, 835, 836. The road segment 830 has associated road segment geometry including an actual road segment width 831, an on_vector 832 and an off_vector 833. Each road segment portion 834, 835, 836 overlaps a portion of a respective map tile 813, 814, 809. Each map tile 808, 809, 813, 814 is surrounded by a respective enlarged bounding box 840, 845, 850, 855.

For the purposes of determining whether the road segment geometry is available within map tile 808, the road segment 830 does not appear in the map tile 808 (block 515), therefore the geometric shape 825 is placed using on_vector 832, off_vector 833 and a maximum road width (block 545). Because the geometric shape portion 826 overlaps a portion of the map tile 808 (block 550), the road segment geometry is determined to not be available in map tile 808 (block 555) even though the road segment portion 835 is located within a portion of the enlarged bounding box 840.

For the purposes of determining whether the road segment geometry is available within map tile 809, the road segment portion 836 appears in map tile 809 (block 515), therefore the geometric shape 825 is placed using on_vector 832, off_vector 833 and the actual road segment width 831 (block 520). The enlarged bounding boxes 840, 845, 850, 855 are calculated because a portion 826, 827, 828, 829 of the geometric shape 825 overlaps a respective portion of a respective map tile 808, 809, 813, 814 (block 525). Although the road segment portion 835 is not within the map tile 808, the road segment portion 835 is within the enlarged bounding box 840 and the road segment 830 is within map tiles 809, 813, 814 (block 535), therefore, the road segment geometry is determined to be available in map tile 809 (block 540).

For the purposes of determining whether the road segment geometry is available within map tile 813, the road segment portion 834 appears in map tile 813 (block 515), therefore the geometric shape 825 is placed using on_vector 832, off_vector 833 and the actual road segment width 831 (block 520). The enlarged bounding boxes 840, 845, 850, 855 are calculated because a portion 826, 827, 828, 829 of the geometric shape 825 overlaps a respective portion of a respective map tile 808, 809, 813, 814 (block 525). Although the road segment portion 835 is not within the map tile 808, the road segment portion 835 is within the enlarged bounding box 840 and the road segment 830 is within map tiles 809, 813, 814 (block 535), therefore, the road segment geometry is determined to be available in map tile 813 (block 540).

For the purposes of determining whether the road segment geometry is available within map tile 814, the road segment portion 835 appears in map tile 814 (block 515), therefore the geometric shape 825 is placed using on_vector 832, off_vector 833 and the actual road segment width 831 (block 520). The enlarged bounding boxes 840, 845, 850, 855 are calculated because a portion 826, 827, 828, 829 of the geometric shape 825 overlaps a respective portion of a respective map tile 808, 809, 813, 814 (block 525). Although the road segment portion 835 is not within the map tile 808, the road segment portion 835 is within the enlarged bounding box 840 and the road segment 830 is within map tiles 809, 813, 814 (block 535), therefore, the road segment geometry is determined to be available in map tile 814 (block 540).

Figure 9:
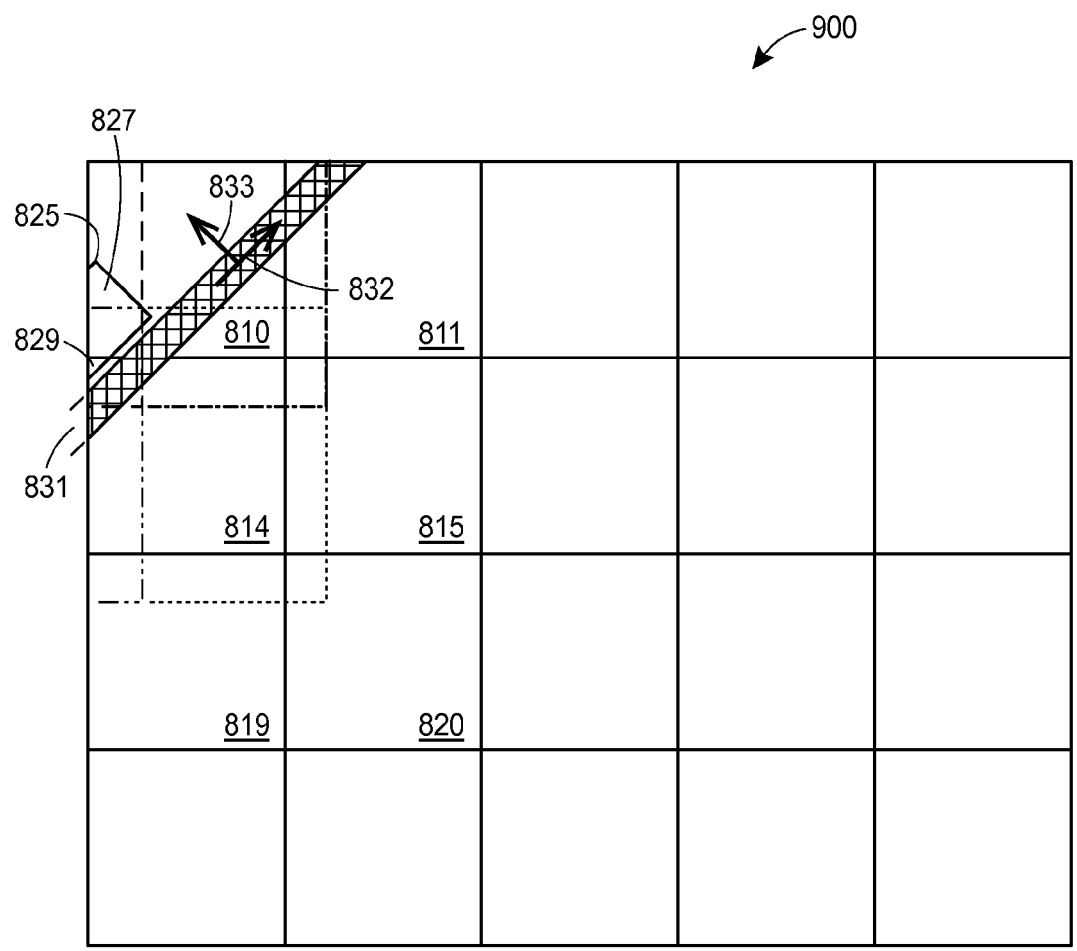
FIG. 9 depicts a map viewport including a portion of the map tiles from FIG. 8.

FIG. 9 depicts a portion of a geographic map within a map viewport 900 including a portion of the map tiles from FIG. 8 (i.e., map tiles 809, 810, 814, 815, 819, 820). Because the road segment geometry was determined to be available within map tiles 809, 814 and those map tiles are the only map tiles included in the map viewport 900 that overlap a portion of the geometric shape 825, the geometric shape 825 is placed within the map viewport 900, using the on_vector 832, the off_vector 833 and the actual road width 831, proximate the road segment 830 because the road segment geometry is available to all map tiles including at least a portion of the geometric shape 825 (i.e., the road segment geometry was determined to be available to both map tiles 809 and 814) (block 415). The geometric shape portions 827, 829 are located within the respective map tiles 809, 814 along with the respective road segment portions 835, 836.

On the other hand, when a similar portion of the map tiles from FIG. 7 (i.e., map tiles 709, 710, 714, 715, 719, 720) are displayed within a map viewport 900, the geometric shape 725 is positioned using on_vector 732, off_vector 733 and a default road width because the road segment geometry is not available to all map tiles including at least a portion of the geometric shape 725 (i.e., the road segment geometry was determined to not be available to either map tile 709 or 714) (block 420).

Figure 10:
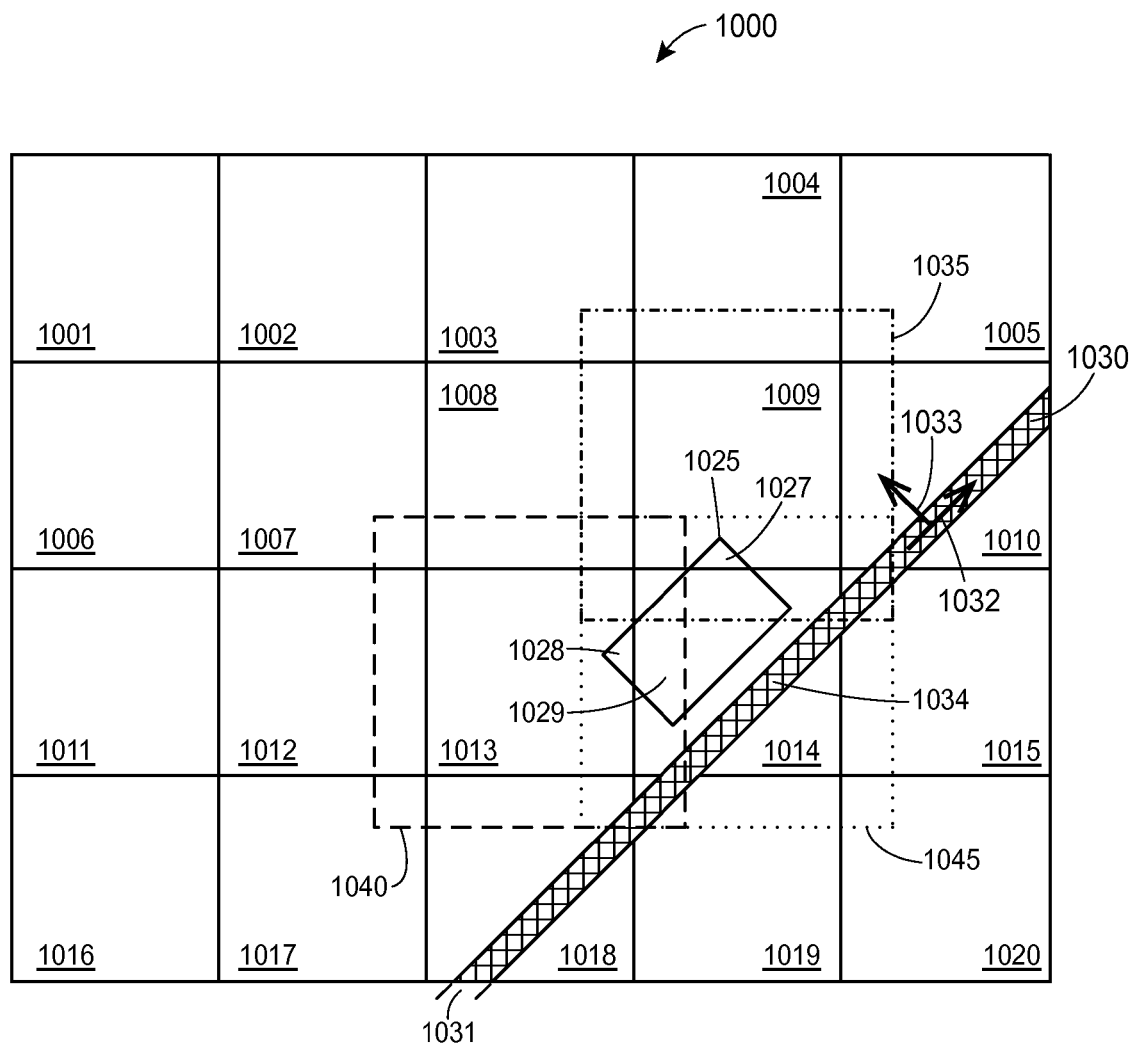
FIG. 10 depicts a third example of a map viewport including a geometric shape that has portions located within three different map tiles of a geographic map proximate a corresponding road.

FIG. 10 depicts a third example of a geographic map within a map viewport 1000 including a plurality of map tiles 1001-1020. The geographic map includes a geometric shape 1025 having portions 1027, 1028, 1029. Each geometric shape portion 1027, 1028, 1029 overlaps a portion of a respective map tile 1009, 1013, 1014. Each map tile 1009, 1013, 1014 is surrounded by a respective enlarged bounding box 1035, 1040, 1045. The geometric shape 1025 is located proximate a corresponding road segment 1030 having a road segment portion 1034. The road segment 1030 has associated road segment geometry including an actual road segment width 1031, an on_vector 1032 and an off_vector 1033.

For the purposes of determining whether the road segment geometry is available within map tile 1009, the road segment 1030 does not appear in the map tile 1009 (block 515), therefore the geometric shape 1025 is placed using on_vector 1032, off_vector 1033 and a maximum road width (block 545). Because the geometric shape portion 1027 overlaps a portion of the map tile 1009 (block 550), the road segment geometry is determined to not be available in map tile 1009 (block 555).

For the purposes of determining whether the road segment geometry is available within map tile 1013, the road segment 1030 does not appear in the map tile 1013 (block 515), therefore the geometric shape 1025 is placed using on_vector 1032, off_vector 1033 and a maximum road width (block 545). Because the geometric shape portion 1028 overlaps a portion of the map tile 1013 (block 550), the road segment geometry is determined to not be available in map tile 1013 (block 555).

For the purposes of determining whether the road segment geometry is available within map tile 1014, the road segment portion 1034 appears in map tile 1014 (block 515), therefore the geometric shape 1025 is placed using on_vector 1032, off_vector 1033 and the actual road segment width 1031 (block 520). The enlarged bounding boxes 1035, 1040, 1045 are calculated because a portion 1027, 1028, 1029 of the geometric shape 1025 overlaps a respective portion of a respective map tile 1009, 1013, 1014 (block 525). Because the road segment 1030 is within the enlarged bounding boxes 1035, 1040 (block 535), the road segment geometry is determined to be available in map tile 1014 (block 540).

When either of the map tiles 1009, 1013 are subsequently included within a given map viewport, the geometric shape 1025 will be positioned using the on_vector 1032, the off_vector 1033 and a default road segment width because the road segment geometry was determined not to be available to the map tiles 1009, 1013 (block 420). On the other hand, when only map tile 1014 is included within a given map viewport, the geometric shape 1025 will be positioned using the on_vector 1032, the off_vector 1033 and the actual road width 1031 (block 415).

Figure 11:
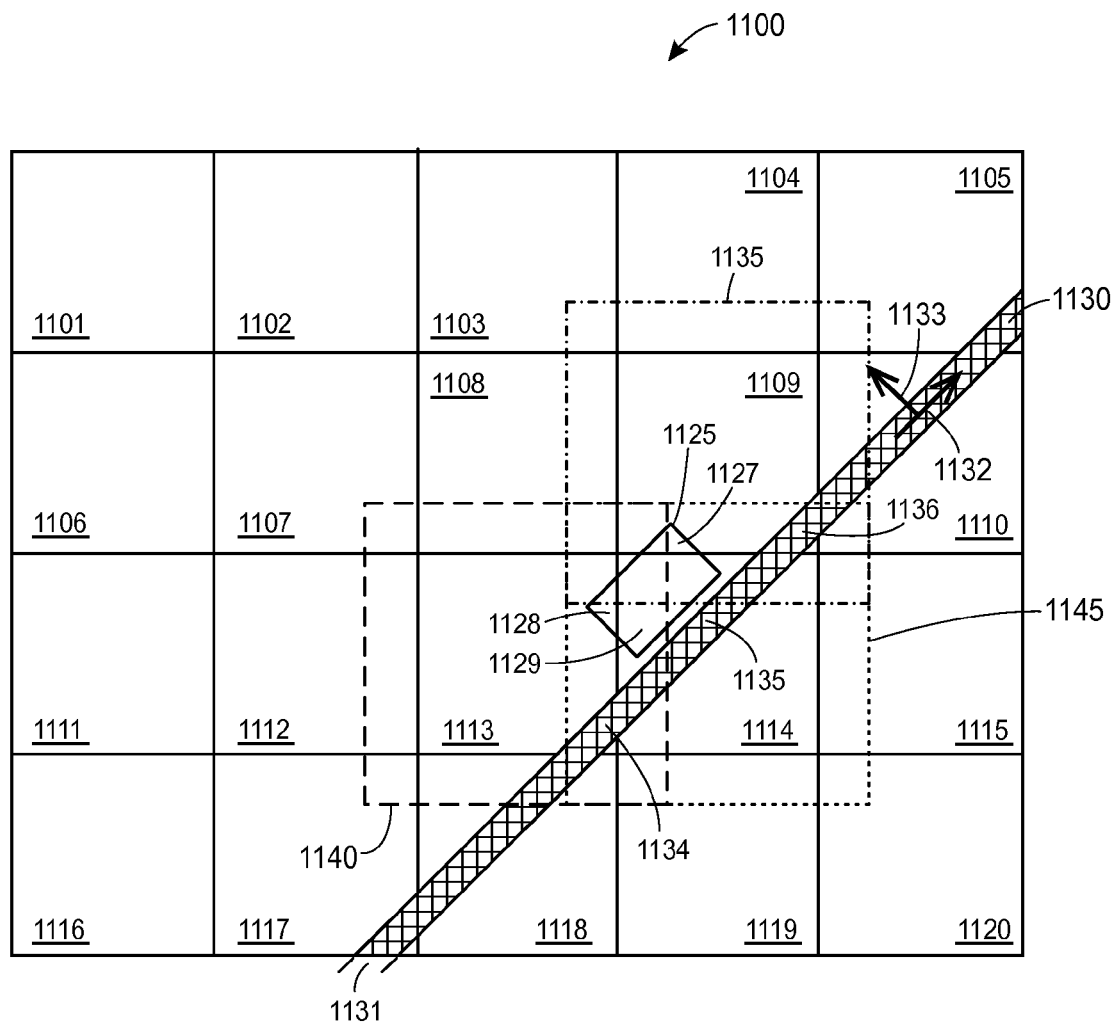
FIG. 11 depicts a fourth example of a map viewport including a geometric shape that has portions located within three different map tiles of a geographic map proximate a corresponding road.

FIG. 11 depicts a fourth example of a geographic map within a map viewport 1100 including a plurality of map tiles 1101-1120. The geographic map includes a geometric shape 1125 having portions 1127, 1128, 1129. Each geometric shape portion 1127, 1128, 1129 overlaps a portion of a respective map tile 1109, 1113, 1114. The geometric shape 1125 is located proximate a corresponding road segment 1130 having road segment portions 1134, 1135, 1136. The road segment 1130 has associated road segment geometry including an actual road segment width 1131, an on_vector 1132 and an off_vector 1133. The road segment portion 1134, 1135, 1136 overlaps a respective portion of a respective map tile 1109, 1113, 1114. Each map tile 1109, 1113, 1114 is surrounded by a respective enlarged bounding box 1135, 1140, 1145.

For the purposes of determining whether the road segment geometry is available within map tile 1109, the road segment portion 1136 appears within map tile 1109 (block 515), therefore the geometric shape 1125 is placed using on_vector 1132, off_vector 1133 and the actual road segment width 1131 (block 520). The enlarged bounding boxes 1135, 1140, 1145 are calculated because a portion 1127, 1128, 1129 of the geometric shape 1125 overlaps a respective portion of a respective map tile 1109, 1113, 1114 (block 525). Because the road segment portions 1134, 1135, 1136 are within all the respective map tiles 1109, 1113, 1114 that overlap the geometric shape 1125, the road segment geometry is determined to be available in map tile 1109 (block 540).

For the purposes of determining whether the road segment geometry is available within map tile 1113, the road segment portion 1134 appears in map tile 1113 (block 515), therefore the geometric shape 1125 is placed using on_vector 1132, off_vector 1133 and the actual road segment width 1131 (block 520). The enlarged bounding boxes 1135, 1140, 1145 are calculated because a portion 1127, 1128, 1129 of the geometric shape 1125 overlaps a respective portion of a respective map tile 1109, 1113, 1114 (block 525). Because the road segment portions 1134, 1135, 1136 are within all the respective map tiles 1109, 1113, 1114 that overlap the geometric shape 1125, the road segment geometry is determined to be available in map tile 1113 (block 540).

For the purposes of determining whether the road segment geometry is available within map tile 1114, the road segment portion 1135 appears in map tile 1114 (block 515), therefore the geometric shape 1125 is placed using on_vector 1132, off_vector 1133 and the actual road segment width 1131 (block 520). The enlarged bounding boxes 1135, 1140, 1145 are calculated because a portion 1127, 1128, 1129 of the geometric shape 1125 overlaps a respective portion of a respective map tile 1109, 1113, 1114 (block 525). Because the road segment portions 1134, 1135, 1136 are within all the respective map tiles 1109, 1113, 1114 that overlap the geometric shape 1125, the road segment geometry is determined to be available in map tile 1114 (block 540).

When any of the map tiles 1109, 1113, 1114 are subsequently included within a given map viewport, the geometric shape 1125 will be positioned using the on_vector 1132, the off_vector 1133 and the actual road segment width 1131 because the road segment geometry was determined to be available to all of the map tiles 1109, 1113, 1114 (block 415).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of components, modules, or mechanisms. Modules may constitute either software modules or hardware modules. A hardware module is tangible unit capable of performing certain operations and may be configured or arranged in a certain manner. In example embodiments, one or more computer systems (e.g., a standalone, display or server computer system) or one or more hardware modules of a computer system (e.g., a processor or a group of processors) may be configured by software (e.g., an application or application portion) as a hardware module that operates to perform certain operations as described herein.

In various embodiments, a module may be implemented mechanically or electronically. For example, a module may comprise dedicated circuitry or logic that is permanently configured (e.g., as a special-purpose processor, such as a field programmable gate array (FPGA) or an application-specific integrated circuit (ASIC)) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods, modules and routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a map editor system for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a method for deterministically placing geometric shapes in geographic maps. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of rendering geometric shapes adjacent to corresponding roads within a geographic map, the method comprising:

determining one or more map tiles on which a geometric shape will be rendered, the geometric shape associated with a road having a corresponding road segment geometry, each map tile comprising graphical data of a corresponding geographical region at a specific zoom level;

determining, for each map tile on which the geometric shape will be rendered, whether the corresponding road segment geometry is available in the map tile, including determining whether the road segment geometry appears on the map tile being rendered and, for map tiles for which it is determined that the road segment does not appear on the map tile being rendered: (i) placing the geometric shape using the first vector, the second vector, and a maximum road width, (ii) determining if the geometric shape overlaps the map tile being rendered and (iii) if the geometric shape overlaps the map tile being rendered, determining that the road segment geometry is unavailable; and rendering each of the one or more map tiles with the geometric shape according to the determination of whether the corresponding road segment geometry is available including:

for each map tile for which the corresponding road segment geometry is available, rendering the map tile with the geometric shape includes using (1) a first vector that is inside of a polyline of the road segment geometry, (2) a second vector, perpendicular to the first vector, that indicates the side of the road on which the geometric shape will be rendered, and (3) a value corresponding to the actual width of the road segment geometry, and for each map tile for which the corresponding road segment geometry is not available, rendering the map tile with the geometric shape includes using (1) a first vector that is inside of a polyline of the road segment geometry, (2) a second vector, perpendicular to the first vector, that indicates the side of the road on which the geometric shape will be rendered, and (3) a value corresponding to a default width of the road segment geometry.

2. A method as in claim 1, wherein determining, for each map tile, whether the corresponding road segment geometry is available further comprises:

determining whether the road segment geometry appears on the map tile being rendered and, for map tiles for which it is determined that the road segment appears on the map tile being rendered:

placing the geometric shape using the first vector, the second vector, and the actual width of the road segment geometry;

calculating a bounding box for each of the set of map tiles in which at least a portion of the geometric shape is located, the bounding box for each map tile being larger than the map tile by a predetermined margin value;

calculating vector geometry for the map tile;

clipping at an edge of the bounding box any road that passes through the bounding box; and determining whether the first vector is within all of the bounding boxes and:

if the first vector is within all of the bounding boxes, determining that the road segment geometry is available.

3. A method as in claim 1, wherein for map tiles for which it is determined that the road segment appears on the map tile being rendered:

placing the geometric shape using the first vector, the second vector, and the actual width of the road segment geometry;

calculating a bounding box for each of the set of map tiles in which at least a portion of the geometric shape is located, the bounding box for each map tile being larger than the map tile by a predetermined margin value;

calculating vector geometry for the map tile;

clipping at an edge of the bounding box any road that passes through the bounding box; and determining whether the first vector is within all of the bounding boxes and:

if the first vector is within all of the bounding boxes, determining that the road segment geometry is available.

4. A non-transitory computer-readable storage medium having stored thereon instructions executable by a processor to cause the processor to perform a method of deterministically positioning geometric shapes at predetermined locations within a geographic map, the method comprising:

determining one or more map tiles on which at least a portion of a geometric shape will be positioned, the geometric shape associated with a road having a corresponding road segment geometry, each map tile comprising graphical data of a corresponding geographical region at a specific zoom level;

determining, for each map tile on which at least a portion of the geometric shape will be positioned, whether the corresponding road segment geometry is available in the map tile, including determining whether the road segment geometry is within the map tile and, for map tiles for which it is determined that the road segment is not within the map tile: (i) placing the geometric shape using the first vector, the second vector, and a maximum road width, (ii) determining if the geometric shape overlaps the map tile and (iii) if the geometric shape overlaps the map tile, determining that the road segment geometry is unavailable; and positioning the geometric shape according to the determination of whether the corresponding road segment geometry is available including:

for each map tile for which the corresponding road segment geometry is available, positioning the geometric shape includes using a value corresponding to the actual width of the road segment geometry, and for each map tile for which the corresponding road segment geometry is not available, positioning the geometric shape includes using a value corresponding to a default width of the road segment geometry.

5. A computer-readable storage medium as in claim 4, wherein determining, for each map tile, whether the corresponding road segment geometry is available further comprises:

determining whether the road segment geometry is within the map tile and, for map tiles for which it is determined that the road segment is within the map tile:

placing the geometric shape using the first vector, the second vector, and the actual width of the road segment geometry;

calculating a bounding box for each of the set of map tiles in which at least a portion of the geometric shape is located, the bounding box for each map tile being larger than the map tile by a predetermined margin value;

calculating vector geometry for the map tile;

clipping at an edge of the bounding box any road that passes through the bounding box; and determining whether the first vector is within all of the bounding boxes and:

if the first vector is within all of the bounding boxes, determining that the road segment geometry is available.

6. A computer-readable storage medium as in claim 4, wherein for map tiles for which it is determined that the road segment is within the map tile:

placing the geometric shape using the first vector, the second vector, and the actual width of the road segment geometry;

calculating a bounding box for each of the set of map tiles in which at least a portion of the geometric shape is located, the bounding box for each map tile being larger than the map tile by a predetermined margin value;

calculating vector geometry for the map tile;

clipping at an edge of the bounding box any road that passes through the bounding box; and determining whether the first vector is within all of the bounding boxes and:

if the first vector is within all of the bounding boxes, determining that the road segment geometry is available.

7. A method of deterministically positioning geometric shapes in predetermined locations within a geographic map, the method comprising:

determining one or more map tiles on which at least a portion of a geometric shape will be positioned, the geometric shape associated with a road having a corresponding road segment geometry, each map tile comprising graphical data of a corresponding geographical region at a specific zoom level;

determining, for each map tile on which at least a portion of the geometric shape will be positioned, whether the corresponding road segment geometry is available in the map tile, including determining whether the road segment geometry is within the map tile and, for map tiles for which it is determined that the road segment is not within the map tile: (i) placing the geometric shape using the first vector, the second vector, and a maximum road width, (ii) determining if the geometric shape overlaps the map tile and (iii) if the geometric shape overlaps the map tile, determining that the road segment geometry is unavailable; and processing each of the one or more map tiles with at least a portion of the geometric shape according to the determination of whether the corresponding road segment geometry is available including:

for each map tile for which the corresponding road segment geometry is available, positioning the geometric shape includes using a value corresponding to the actual width of the road segment geometry, and for each map tile for which the corresponding road segment geometry is not available, positioning the geometric shape includes using a value corresponding to a default width of the road segment geometry.

8. A method as in claim 7, wherein determining, for each map tile, whether the corresponding road segment geometry is available further comprises:

determining whether the road segment geometry is within the map tile and, for map tiles for which it is determined that the road segment is within the map tile:

placing the geometric shape using the first vector, the second vector, and the actual width of the road segment geometry;

calculating a bounding box for each of the set of map tiles in which at least a portion of the geometric shape is located, the bounding box for each map tile being larger than the map tile by a predetermined margin value;

calculating vector geometry for the map tile;

clipping at an edge of the bounding box any road that passes through the bounding box; and determining whether the first vector is within all of the bounding boxes and:

if the first vector is within all of the bounding boxes, determining that the road segment geometry is available.

9. A method as in claim 7, wherein determining, for each map tile, whether the corresponding road segment geometry is available further comprises:

determining whether the road segment geometry is within the map tile and, for map tiles for which it is determined that the road segment is not within the map tile:

placing the geometric shape using the first vector, the second vector, and a maximum road width;

determining if the geometric shape overlaps the map tile and:

if the geometric shape overlaps the map tile, determining that the road segment geometry is unavailable; and for map tiles for which it is determined that the road segment is within the map tile:

placing the geometric shape using the first vector, the second vector, and the actual width of the road segment geometry;

calculating a bounding box for each of the set of map tiles in which at least a portion of the geometric shape is located, the bounding box for each map tile being larger than the map tile by a predetermined margin value;

calculating vector geometry for the map tile;

clipping at an edge of the bounding box any road that passes through the bounding box; and determining whether the first vector is within all of the bounding boxes and:

if the first vector is within all of the bounding boxes, determining that the road segment geometry is available.

10. A computing device for rendering geometric shapes adjacent to corresponding roads in a mapping interface, the computing device comprising:

a memory and a processor;

a map tile determination module stored on the memory that, when executed on the processor, determines one or more map tiles on which a geometric shape will be rendered, the geometric shape associated with a road having a corresponding road segment geometry, each map tile comprising graphical data of a corresponding geographical region at a specific zoom level;

a road segment geometry availability determination module stored on the memory that, when executed on the processor, determines, for each map tile on which the geometric shape will be rendered, whether the corresponding road segment geometry is available in the map tile, including determining whether the road segment geometry appears on the map tile being rendered and, for map tiles for which it is determined that the road segment does not appear on the map tile being rendered (i) placing the geometric shape using the first vector, the second vector, and a maximum road width, (ii) determining if the geometric shape overlaps the map tile being rendered and (iii) if the geometric shape overlaps the map tile being rendered, determining that the road segment geometry is unavailable; and a map tile rendering module stored on the memory that, when executed on the processor, renders each of the one or more map tiles with the geometric shape according to the determination of whether the corresponding road segment geometry is available including:

for each map tile for which the corresponding road segment geometry is available, rendering the map tile with the geometric shape includes using (1) a first vector that is inside of a polyline of the road segment geometry, (2) a second vector, perpendicular to the first vector, that indicates the side of the road on which the geometric shape will be rendered, and (3) a value corresponding to the actual width of the road segment geometry, and for each map tile for which the corresponding road segment geometry is not available, rendering the map tile with the geometric shape includes using (1) a first vector that is inside of a polyline of the road segment geometry, (2) a second vector, perpendicular to the first vector, that indicates the side of the road on which the geometric shape will be rendered, and (3) a value corresponding to a default width of the road segment geometry.

11. A computing device as in claim 10, wherein the road segment geometry availability determination module determines, for each map tile, whether the corresponding road segment geometry is available further comprises:

determining whether the road segment geometry appears on the map tile being rendered and, for map tiles for which it is determined that the road segment appears on the map tile being rendered:

placing the geometric shape using the first vector, the second vector, and the actual width of the road segment geometry;

calculating a bounding box for each of the set of map tiles in which at least a portion of the geometric shape is located, the bounding box for each map tile being larger than the map tile by a predetermined margin value;

calculating vector geometry for the map tile;

clipping at an edge of the bounding box any road that passes through the bounding box; and determining whether the first vector is within all of the bounding boxes and:

if the first vector is within all of the bounding boxes, determining that the road segment geometry is available.

12. A non-transitory computer-readable storage medium having stored thereon instructions executable by a processor to cause the processor to perform a method of rendering geometric shapes adjacent to corresponding roads in a mapping interface, the method comprising:

determining one or more map tiles on which a geometric shape will be rendered, the geometric shape associated with a road having a corresponding road segment geometry, each map tile comprising graphical data of a corresponding geographical region at a specific zoom level;

determining, for each map tile on which the geometric shape will be rendered, whether the corresponding road segment geometry is available in the map tile, including determining whether the road segment geometry appears on the map tile being rendered and, for map tiles for which it is determined that the road segment does not appear on the map tile being rendered: (i) placing the geometric shape using the first vector, the second vector, and a maximum road width, (ii) determining if the geometric shape overlaps the map tile being rendered and (iii) if the geometric shape overlaps the map tile being rendered, determining that the road segment geometry is unavailable; and rendering each of the one or more map tiles with the geometric shape according to the determination of whether the corresponding road segment geometry is available including:

for each map tile for which the corresponding road segment geometry is available, rendering the map tile with the geometric shape includes using a value corresponding to the actual width of the road segment geometry, and for each map tile for which the corresponding road segment geometry is not available, rendering the map tile with the geometric shape includes using a value corresponding to a default width of the road segment geometry.

13. A computer-readable storage medium as in claim 12 wherein rendering the map tile with the geometric shape further includes using a first vector that is inside of a polyline of the road segment geometry and a second vector, perpendicular to the first vector, that indicates the side of the road on which the geometric shape will be rendered.

14. A computer-readable storage medium as in claim 13, wherein determining, for each map tile, whether the corresponding road segment geometry is available further comprises:

determining whether the road segment geometry appears on the map tile being rendered and, for map tiles for which it is determined that the road segment appears on the map tile being rendered:

placing the geometric shape using the first vector, the second vector, and the actual width of the road segment geometry;

calculating a bounding box for each of the set of map tiles in which at least a portion of the geometric shape is located, the bounding box for each map tile being larger than the map tile by a predetermined margin value;

calculating vector geometry for the map tile;

clipping at an edge of the bounding box any road that passes through the bounding box; and determining whether the first vector is within all of the bounding boxes and:

if the first vector is within all of the bounding boxes, determining that the road segment geometry is available.

15. A computer-readable storage medium as in claim 12, wherein for map tiles for which it is determined that the road segment appears on the map tile being rendered:

placing the geometric shape using the first vector, the second vector, and the actual width of the road segment geometry;

calculating a bounding box for each of the set of map tiles in which at least a portion of the geometric shape is located, the bounding box for each map tile being larger than the map tile by a predetermined margin value;

calculating vector geometry for the map tile;

clipping at an edge of the bounding box any road that passes through the bounding box; and determining whether the first vector is within all of the bounding boxes and:

if the first vector is within all of the bounding boxes, determining that the road segment geometry is available.

* * * * *